United States Patent [19]

Khinkis

[11] Patent Number: 4,877,449
[45] Date of Patent: Oct. 31, 1989

[54] VERTICAL SHAFT MELTING FURNACE AND METHOD OF MELTING

[75] Inventor: Mark J. Khinkis, Morton Grove, Ill.

[73] Assignee: Institute of Gas Technology, Ill.

[21] Appl. No.: 76,491

[22] Filed: Jul. 22, 1987

[51] Int. Cl.⁴ .................. C22B 9/16; F27B 1/24; C03B 3/00; C03B 5/12
[52] U.S. Cl. .................. 75/20 R; 75/43; 75/44 R; 75/44 S; 75/65 R; 75/72; 75/76; 65/135; 65/335; 266/185; 266/218; 266/900
[58] Field of Search .......... 75/43, 44 R, 44 S, 40, 75/38, 20 R, 65, 72, 76; 266/185, 900, 218; 65/135, 335

[56] References Cited

U.S. PATENT DOCUMENTS

| 1,713,543 | 5/1929 | Machlet | 266/900 |
|---|---|---|---|
| 3,157,492 | 11/1964 | Matuschkovitz | |
| 3,169,015 | 2/1965 | Henry | |
| 3,224,855 | 12/1965 | Plumat | 65/135 |
| 3,253,906 | 5/1966 | Secord | 75/40 |
| 3,260,587 | 7/1966 | Dolf et al. | 65/135 |
| 3,424,573 | 1/1969 | De Villiers | 75/43 |
| 3,788,832 | 1/1974 | Nesbitt et al. | 65/134 |
| 3,802,678 | 4/1974 | Taft et al. | 266/218 |
| 3,948,642 | 4/1976 | Gross | 75/12 |
| 3,948,647 | 4/1976 | Cherny | 75/43 |
| 4,097,028 | 6/1978 | Langhammer | 266/47 |
| 4,101,313 | 7/1978 | Vayssiere et al. | 75/38 |
| 4,110,108 | 8/1978 | Geck et al. | 75/48 |
| 4,140,480 | 2/1979 | Kaiser et al. | 266/156 |
| 4,203,761 | 5/1980 | Rose | 75/40 |
| 4,605,437 | 8/1986 | Sugiura et al. | 75/43 |
| 4,758,270 | 7/1988 | Bardenheuer | 75/43 |

FOREIGN PATENT DOCUMENTS 975569 11/1964 United Kingdom.
1326884 8/1973 United Kingdom.

Primary Examiner—Melvyn J. Andrews
Attorney, Agent, or Firm—Thomas W. Speckman; Douglas H. Pauley

[57] ABSTRACT

A vertical shaft melting furnace wherein meltable solids are charged to the upper region of a bed supported only by a fluid cooled support grid having openings smaller than the average diameter of the charged solids wherein submerged combustion is maintained in a melt pool below the bed of solids and combustion product gases of the submerged combustion are passed upwardly through the bed of solids preheating and melting a substantial portion of the solids forming melt which flows downwardly into the melt pool and partially melting the remaining portion of the solids reducing their size sufficiently to pass through the support grid openings into the melt pool. The apparatus and process of this invention provides improved melt quality with stable temperature and high homogeneity with increased specific production rate and increased unit production rate.

49 Claims, 3 Drawing Sheets

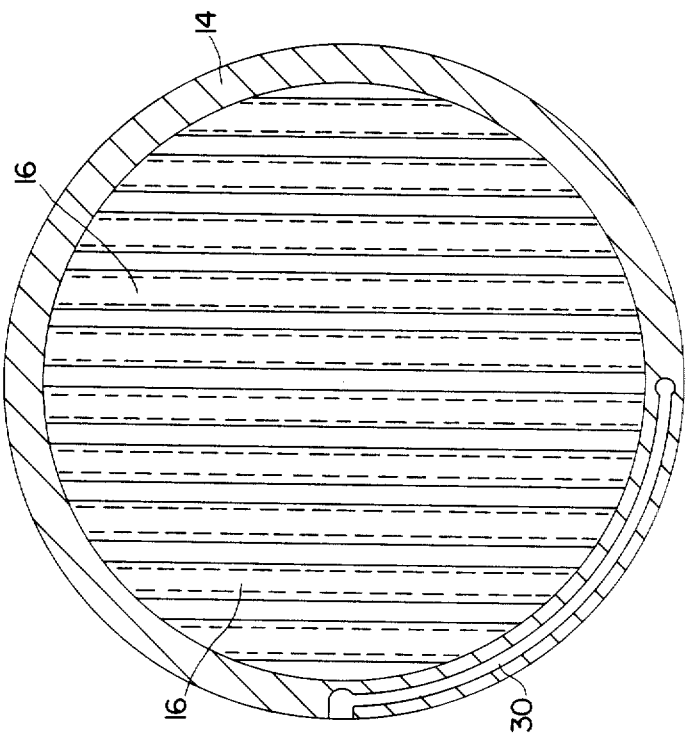

VERTICAL SHAFT MELTING FURNACE AND METHOD OF MELTING

BACKGROUND OF THE INVENTION

1. Field of the Invention

This invention relates to vertical shaft solids continuous melting furnaces wherein solid feeds are charged to the top forming a bed of feed materials supported by a cooled grid. The charged solids move downwardly in the bed and are contacted by countercurrent hot combustion product gases causing intensive preheating and substantial melting of the solids above the cooled grid. The melt flows downwardly through the lower portion of the bed and through the grid, with some small solids, into a submerged fired or oxidizing gas blown melt pool at the bottom of the vertical shaft melting furnace. The vertical shaft solids melting furnace may be combined with a number of melt treating configurations. Conventional fossil derived fuels or organics containing charge may be used to result in higher combustion, melting and melt treating intensities with higher production rates, higher thermal efficiencies, and lower capital and operating costs. The product provided by the apparatus and process of this invention is of high quality and without contaminants as resulted from many prior melting and melt treating processes.

2. Description of the Prior Art

Conventional, commercially used melting and melt treating furnaces include principally reverberatory furnaces and cupolas. Reverberatory furnaces have been very expensive in capital cost and operation, providing low specific production rates and low thermal efficiencies. While cupolas have been less expensive and have higher specific production rates, they have used expensive coke and frequently the quality of the melt is relatively low due to poor homogeneity and temperature fluctuations while emissions of carbon monoxide, unburned hydrocarbons, and hydrogen sulfide have been higher than desired. There has been some testing of new approaches using rotary, cyclonic and other flash type melters as well as electric melters, but these have not proved entirely satisfactory for many industrial applications. A major drawback of these new approaches using fossil fuel is the absence of satisfactory reliable heat recovery systems necessary to achieve high thermal efficiency of the furnace. All of the heat recovery systems known to the applicant to have been tested with such furnaces failed to operate reliably in flue gas streams highly loaded with particulates, molten droplets and vapors.

A process and apparatus for melting of pig iron in a rotary furnace is illustrated by U.S. Pat. No. 4,101,313. U.S. Pat. No. 4,140,480 teaches a cupola having alternate layers of charge and coke with a flue gas bypass from the lower portion of the bed to the headspace providing self-ignition of carbon monoxide. Preheating of charged solids in a cupola by passing combustion gases or flue gases in contact with the charged solids is exemplified by U.S. Pat. Nos. 4,605,437; 4,203,761; 3,788,832; 3,424,573; 3,169,015; 3,157,492; and 1,713,543. It is also known to charge metallic solids into a vertical chamber and conduct the melting by flames at the bottom of the solids column, the solids being supported by an arch of the solid material welded together above the flame at the bottom as taught by U.S. Pat. Nos. 4,110,108; 4,097,028; and 3,948,642. It is also known to support the solid particles to be melted in a cupola on top of a refractory bed which is supported by a water cooled grid as taught by British Pat. Nos. 1,326,884 and 975,569. Submerged combustion melting of glass batch and cullet is known wherein the raw material is supplied directly to the liquid glass in the melting chamber and submerged combustion is effected by burners completely submerged under the molten glass to effect the melting as taught by U.S. Pat. No. 3,260,587. One disadvantage of prior submerged combustion processes has been lower furnace thermal efficiency than desired.

Problems encountered with the prior art fossil fuel fired cupola melting using coke admixed with the charged solids have been that melt quality has not been as high as desired due to coke contamination; the melt has not been as homogeneous as desired; nor has the melt temperature been controllable within ranges desired. In addition, prior art cupola melting has produced undesired amounts of carbon monoxide, unburned hydrocarbon, and hydrogen sulfide emissions. There have been attempts to develop cokeless cupolas which have been natural gas fired and have water cooled grids with a coke bed on top of the grids to support the solids and to allow melt to flow through to a melt pool. These have not proved entirely satisfactory since there is still undesired contamination to the melt by coke particles falling through the support grid into the melt and there are still undesired carbon monoxide, unburned hydrocarbon, and hydrogen sulfide emission problems. Attempts to substitute a refractory bed for the coke bed as a solids support on top of the water cooled grid has not been entirely satisfactory since refractory particles drop into the melt contaminating it and, further, it has been necessary to replace such refractory beds more frequently than desired.

SUMMARY OF THE INVENTION

The present invention relates to a substantially vertical shaft melting furnace and process wherein solid charge may be continuously added to the top and passes downwardly countercurrent to hot combustion product gases in a preheating and size reduction melting zone providing intensive preheating and melting of the charge using sensible heat of the combustion product gases due to the high mean temperature difference and high heat transfer rate between combustion product gases and charge in the bed. The solid charge is supported on a cooled distribution grid having openings smaller than the average diameter of the solid charge material. A portion of the solid charge particles melts above the cooled grid with the melt flowing downwardly through the cooled grid to a submerged combustion melt pool at the bottom of the melting part of the furnace. The partially melted solid charge particles have a reduced size after passing through the preheating and size reduction melting zone and when such particles reach the cooled grid they are of sufficiently small size to pass together with the melt through the cooled grid to the melt collection zone where melting is completed by submerged combustion. Submerged combustion provides extremely high combustion intensity and high heat transfer rates to the melt. Submerged combustion also provides intensive convection currents in the melt, high heat and mass transfer rates between the melt in the collection zone, fresh melt and charge particles entering the melt resulting in rapid melting of these particles. High heat transfer rates to the melt result in low peak flame temperatures, which with the low excess air necessary for high efficiency combustion, results in low $NO_x$ in the combustion product gases. In one embodiment, it is desirable to fire into a freeboard zone, above the melt and blow the cooled grid, for added process control and to make possible substoichiometric submerged firing by fossil fuel. In another embodiment, molten charge, part of the solid charge and/or desired additives, as well as some amount of small sized charge particles, may be directly added to the melt. Particulate emissions abatement is obtained by the charge bed holding particles and molten droplets and condensing and precipitating chemical vapors from the combustion product gases.

The apparatus and process of this invention may be used in a wide variety of melting and melt treating industrial processes such as used in the building materials industry, for example, for mineral wool and fiberglass production; in the chemical industry, for example, for thermal phosphorous production and for chromium ore roasting; in the steel industry, for example, for scrap melting; in the copper industry for scrap and for copper ore melting; in waste thermal treating industry for solid, sludge, and liquid waste incineration; and for other similar solids melting operations.

It is an object of this invention to provide an apparatus and process for continuous, intensive preheating and melting solid charge particles in a substantially vertical shaft furnace which does not utilize coke, ceramics, or other foreign particulates to support the charged solids in a preheating and/or melting zone.

It is another object of this invention to provide an apparatus and process wherein solid charge particles are supported upon a cooled grid providing substantial melting and size reduction of the particles above the grid by thermal exchange with countercurrent hot combustion product gases of submerged combustion in a lower pool of melted charge materials.

It is still another object of this invention to provide high efficiency submerged combustion melting wherein charge preheating and a substantial portion of the melting of the charge and size reduction of charge particles is achieved by passing charge downwardly countercurrent to a hot stream of combustion product gases passing upwardly through a substantially vertical shaft furnace.

It is yet another object of this invention to provide a substantially vertical shaft furnace having increased specific production rate and increased unit production rate.

It is another object of this invention to provide a substantially vertical shaft melter providing improved melt quality with stable temperature and high homogeneity.

It is still another object of this invention to provide a process and apparatus for continuous charge feeding wherein the charge may be added in solid and/or molten state.

It is yet another object of this invention to provide a process and apparatus having low gaseous, liquid, and particulate pollutant emissions.

BRIEF DESCRIPTION OF THE DRAWINGS

The above and further features of this invention will become apparent, and the invention will be best understood by reference to the following description of preferred embodiments when read in conjunction with the drawing wherein:

FIG. 5 is a top view of a fluid cooled support grid, as shown in FIGS. 1 and 2.

DESCRIPTION OF PREFERRED EMBODIMENTS

Figure 1:
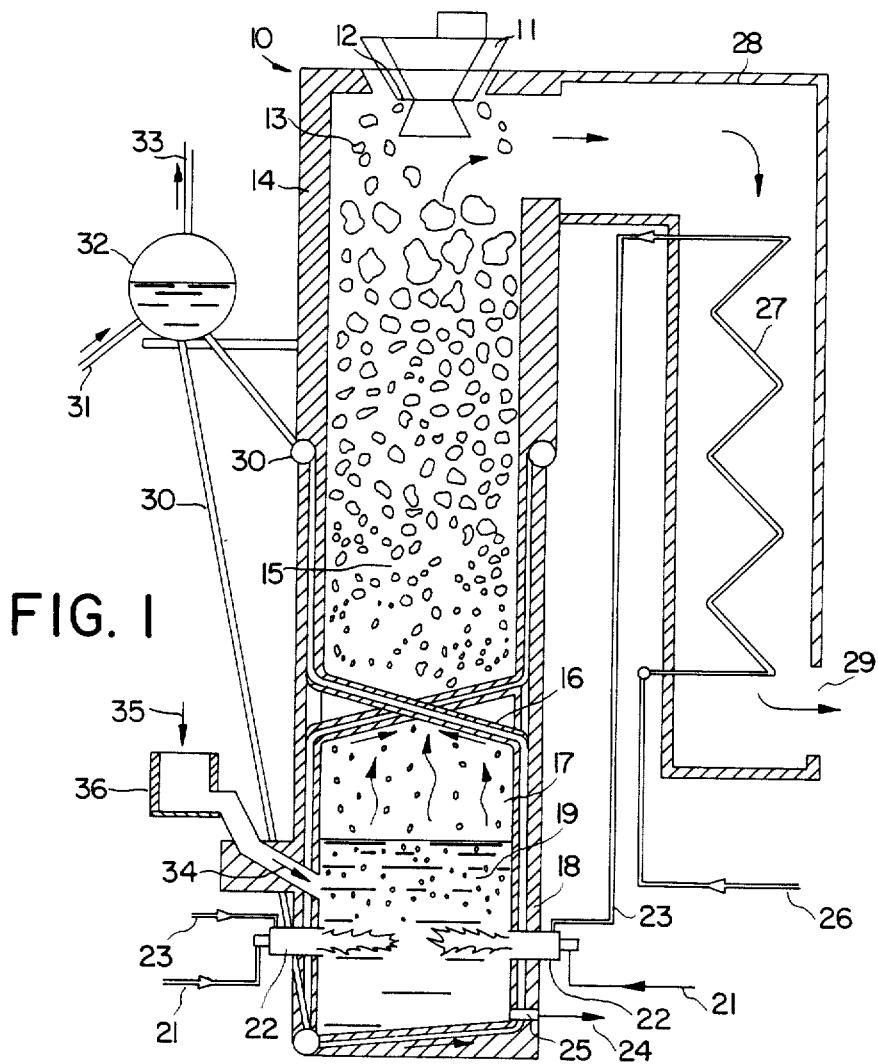
FIG. 1 is a sectional side view of a single melting shaft apparatus according to one embodiment of this invention.

Referring to FIG. 1, a sectional side view of an apparatus according to one embodiment of this invention is shown generally as vertical shaft melting furnace 10. Melting furnace 10 has containment walls 14 of any suitable structure as known to the art for operation at the desired temperatures of the specific process. Generally, the vertical shaft melting furnaces are refractory lined. Solids charge feeder 11 is installed at the top of the vertical shaft melting furnace and has charge entrance 12 capable of supplying charged solids to the interior of the vertical shaft melting furnace. Any suitable charge feeder means as known to the art may be used to provide the desired continuous or intermittent feed of solid particles to the top of the melting furnace. Charge particles may be in the form of pellets, briquetts, agglomerates or individual particles with average particle diameters from about ¼ inch to 3 inches. Charge feeder 11 distributes the solid charge particles across the cross section of the melting furnace and forms solids bed 15 supported by cooled support grid 16. Cooled support grid 16 has openings smaller than the average diameter of the solid charge particles fed to the top of the bed to obtain desired preheating and melting in the preheating, size reduction and melting zone extending upwardly through the solids bed from the cooled support grid. It is suitable to melt about 5 to about 95 weight percent of the solid charge particles in the bed above the cooled support grid, about 25 to about 75 weight percent being preferred. The cooled support grid openings in any form, such as slots, as shown in FIG. 5 rectangular or square holes, annular slots, a helical slot, or the like, dependent upon the form of the support grid fluid conduits which may lie in a single generally horizontal plane or in any number of planes in a vertical direction, such as a sloping cooled support grid. Cooled support grid openings do not need to be of uniform size. Cooled support grid 16 comprises a tubular or any other shape structure through which cooling fluid may be passed and is covered on the exterior with refractory material. In operation, a frozen layer of melt will naturally form over the refractory covering thereby further protecting the cooled support grid structure and its refractory covering providing for desired long lifetime of the support grid. As shown in FIG. 1, there is a freeboard zone 17 beneath cooled support grid 16 and above melt pool 19. In another embodiment, cooled support grid 16 may be immersed in melt pool 19 without any freeboard space.

As shown in FIG. 1, molten feed, liquid or solid additives as desired for the specific process, and a portion of the feed solids, preferably having smaller average diameters than support grid 16 openings may be supplied as indicated by supply line 35 to any suitable supply means 36 feeding through port 34 directly into melt pool 19. This permits feeding of both melts and solids directly to melt pool 19 in addition to the major feeding of solid charge particles to the top of solids bed 15 through charge feeder 11. Only a partial amount of the solid charge particles, preferably less than about 50 percent of the total of solid materials may be added directly to melt pool 19. The material added through charging port 34 is vigorously mixed with melt in pool 19 by intensive melt currents resulting from the submerged combustion.

Figure 2:
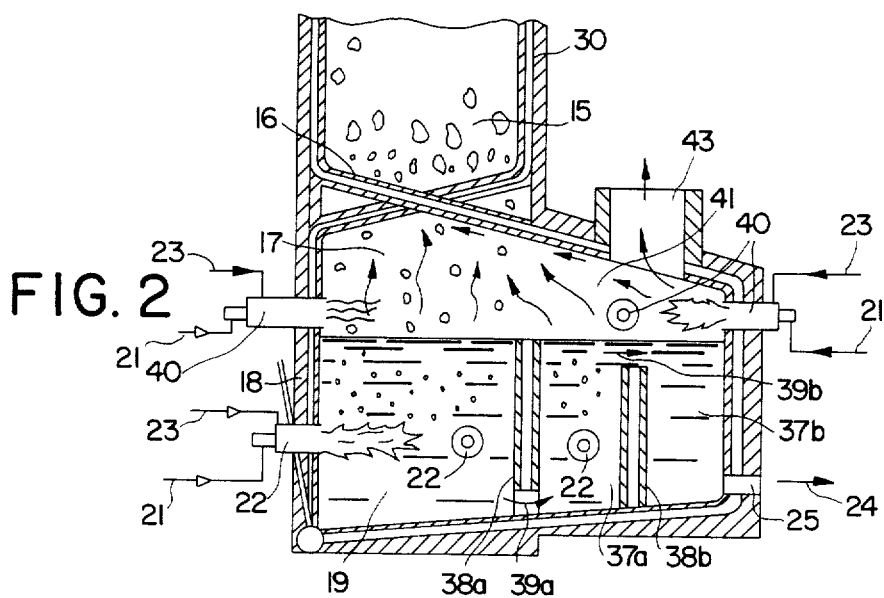
FIG. 2 is a sectional side view of a lower portion of an apparatus having a melt treatment section according to another embodiment of this invention.

Submerged combustion burners or tuyeres 22 are installed in the walls and/or in the bottom of melting tank portion 18 of vertical shaft melting furnace 10. Freeboard combustion burners or tuyeres 40, as shown in FIG. 2, may also be employed in the melter shown in FIGS. 1, 3 or 4 for added control and/or desired substoichiometric submerged combustion. The burners may be of any suitable known design and fed fuel through fuel supply means 21. Oxidizing gas may be supplied through oxidizing gas supply means 23. The tuyeres may be of any suitable known design and fed only oxidizing gas.

Fuels for supplying submerged and freeboard burners used in the melting furnace of this invention include fossil-derived and synthetic fuels. Gaseous, liquid, vaporized liquid, pulverized solid, and solid/liquid mixture fuels may be used. Preferred hydrocarbon fuels include natural gas, synthetic natural gas (SNG), propane and other mixtures comprising low molecular weight hydrocarbonaceous materials, such as methane. The fuel may comprise additives known to the art for specific purposes. The fuel may be preheated by any means known to the art including, preferably, by thermal transfer with the product gases formed by the combustion. It is preferred the fuel be preheated to temperatures of about 500° to about 1500° F. The fuel may be combusted using oxidizing gas comprising atmospheric air alone, oxygen-rich gas having higher oxygen content than air and including up to 100 percent oxygen. Commercially available "industrial" oxygen is in the order of 75 volume percent and higher oxygen and is satisfactory for use in the burners according to the present invention. It is desired to preheat the oxidizing gas or a portion of it to about 500° to about 1500° F. by any known thermal transfer means, preferably utilizing the thermal energy in the combustion product gases exiting the vertical shaft melting furnace. The fuel and the oxidizing gas may be mixed by any known method including mixing before the burner, mixing in the burner, mixing at the exit of the burner, or the oxidizing gas and fuel may be introduced separately to the zone in which combustion takes place. In one embodiment of this invention, the vertical shaft melting furnace can be operated, except for start-up, without fuel in cases where the charge material itself is combustible. In such cases, combustion is controlled by admission of oxidizing gas to the appropriate combustion zones through tuyeres installed instead of burners.

As shown in FIG. 1, submerged combustion takes place in melt pool 19 completely melting solids which have been added to melt pool 19 and provides vigorous mixing of the melt in pool 19 resulting in high product homogeneity. Further, submerged combustion in melt pool 19 provides accurate temperature control of the melt, such as is desired in mineral wool fiberization or other industrial processes. Submerged combustion may utilize natural gas as a fuel or other low-sulfur fuels and provide complete combustion, thereby resulting in very low sulfur, carbon monoxide, and unburned hydrocarbon containing products of combustion when operation in an oxidizing mode is desirable. Operation under reducing conditions may be achieved by providing oxidizing gas in an amount for substoichiometric combustion or no oxidizing gas is injected through the tuyeres with only fuel or other reducing agent being injected into the melt. Melt 24 may be withdrawn through melt discharge port or ports 25 located in the side walls or in the bottom of melting section 18 of shaft melting furnace 10.

Combustion product gases from submerged combustion, and freeboard combustion if present, pass upwardly through cooled support grid 16 and countercurrent to solids bed 15, through flue 28 and discharged through flue opening 29. In one preferred embodiment, heat exchanger 27 is located in flue 28 to preheat oxidizing gas from oxidizing gas supply 26. Fuel may be preheated in a similar manner.

Cooling may be provided to high temperature sections of the furnace walls and bottom, as shown in FIG. 1, by cooling system 30 shown as any suitable arrangement of cooling conduits as known to the art for transport of cooling media, such as water, steam/water, thermal fluid, and the like, which may be fed from supply means 31 to storage means 32 and from there fed through cooling conduits in the lower portion of the furnace side walls, bottom and cooled support grid 16 and exiting the cooling system through conduit 33. In one embodiment, steam may be withdrawn through conduit 33 and used as process steam, for heating, air conditioning, and the like.

FIG. 2 shows another embodiment of this invention wherein melting section 18 has contiguous melt treating sections 37 for physical conditioning or chemical processing of the melt. The melt treating sections are separated from melt pool 19 by partition 38a having openings 39 as desired for treatment of the melt by any known treating processes. Additional submerged combustion burners or tuyeres 22 may be located in treating section 37 as desired, and/or freeboard combustion burners or tuyeres 40 may be located above the melt level in the treating section. Product melt discharge port 25 is located in the last melt treating section. Headspace 41 above the treating sections may be open to freeboard space 17 above melt pool 19, as shown in FIG. 2, or headspace 41 may be separated from freeboard space 17 by extending partition 38a upwardly. Flue 43 may be provided for combustion product gases from the melt treating sections, or combustion product gases from the melt treating sections may also be directed through cooled support grid 16 and solids bed 15 in the melting part of the furnace.

Figure 3:
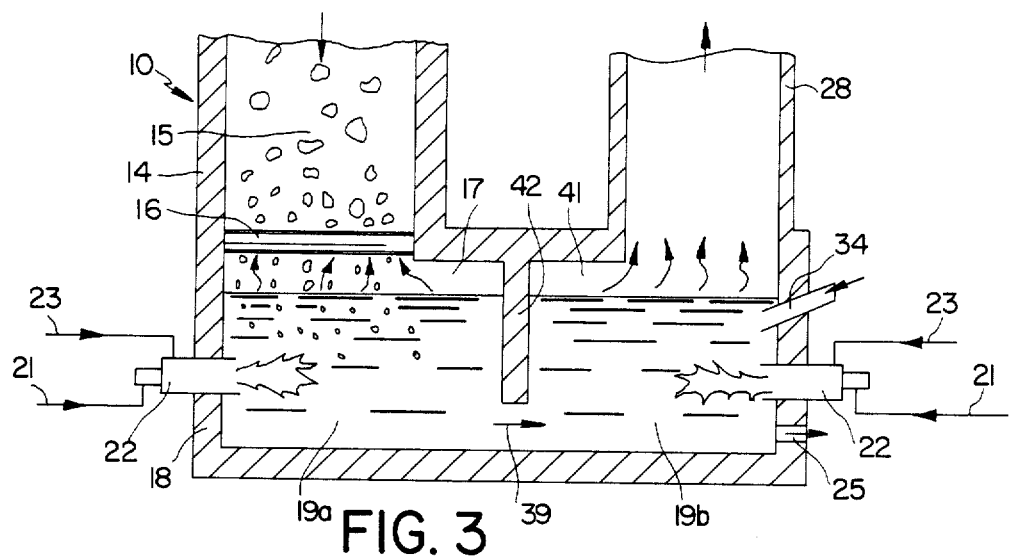
FIG. 3 is a sectional side view of a lower portion of an apparatus having a melt treatment section according to another embodiment of this invention.
Figure 4:
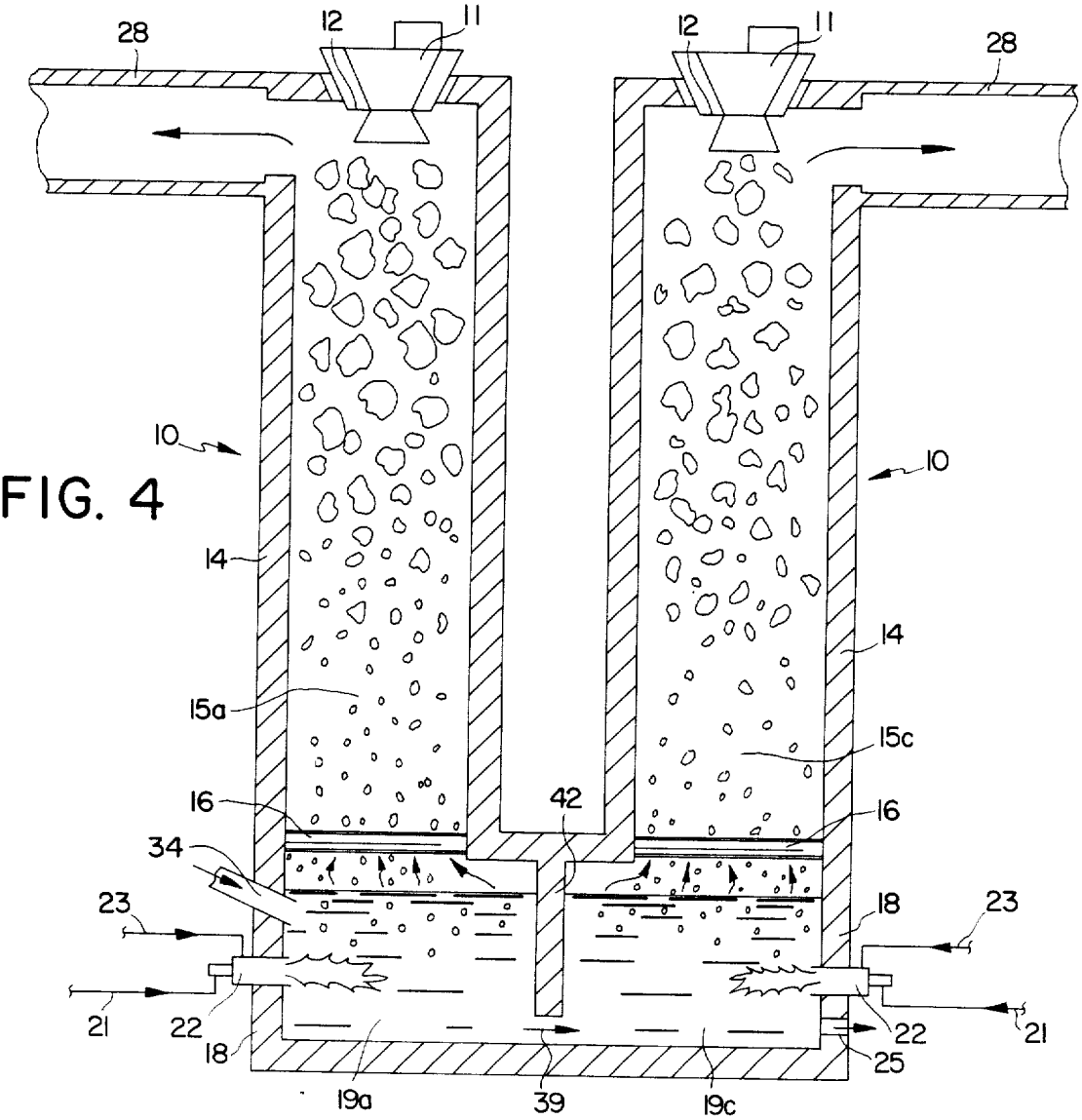
FIG. 4 is a sectional side view of a double melting shaft apparatus according to another embodiment of this invention.

The vertical shaft melting furnace of this invention may be used with a number of melt treating processes which may be integrated with and advantageously directly connected with melt pool 19 of vertical shaft melting furnace 10. FIG. 2 shows one embodiment of melt treating sections 37 directly connected with melt pool 19 and having open directly connected headspace 41 and freeboard zone 17. FIGS. 3 and 4 are somewhat schematic, not showing cooling conduits in the furnace walls and bottom and not showing supply and removal conduits to and from cooled support grid 16 which may be achieved by any means which will be apparent upon reading this disclosure. FIGS. 3 and 4 show other embodiments of combining the vertical shaft melter of this invention with various melt treatments. In FIG. 3, melt pool 19a below vertical shaft melting furnace 10 is contiguous with melt treatment pool 19b below flue 28, the flow from melt pool 19a to 19b controlled by openings 39 in downwardly extending partition 42. Downwardly extending partition 42 physically separates headspace 41 above melt treatment pool 19b from freeboard zone 17 above melt pool 19a with headspace 41 passing directly into flue 28. Charging port 34 is provided for addition of desired additives to melt treatment pool 19b. In the embodiment shown in FIG. 3 separate melting and treatment conditions may be maintained, such as oxidizing conditions in the melter portion and reducing conditions in the treatment portion. A melter-melt treatment configuration as shown in FIG. 3 may advantageously be used in the thermal production of phosphorous from phosphate rock. Phosphate rock and desired additives may be added to the vertical shaft melter operated under oxidizing conditions with molten phosphorous melt passing from melt pool 19a to melt treatment pool 19b. Melt treatment pool 19b may be maintained at higher temperature than melt pool 19a and under chemical reducing conditions by addition of a reducing agent through charging port 34. Elemental phosphorous is removed as a vapor through flue 28 and later condensed while remaining melt is drawn off through discharge port 25 as waste or as a byproduct. In a similar manner ores may be refined in the configuration shown in FIG. 3, for example copper which may be drawn off melt treatment pool 19b as melt.

FIG. 4 shows an embodiment of the vertical shaft melting furnace of this invention wherein two vertical shaft melting furnaces feed into a single melt discharge port. The embodiment shown in FIG. 4 has solids bed 15a with its melt and small solids falling into melt pool 19a and solids bed 15c with its melt and small solids falling into melt pool 19c. This embodiment may advantageously be used with charge of iron ore being added to solids bed 15a which under reducing conditions by reducing agent being added through charging port 34 and charge of scrap iron being added to solids bed 15c which is maintained under oxidizing conditions by excess oxidizing agent added to that section of the melting furnace or melt pool 19c. Melt from both the iron ore and scrap iron is mixed in melt pool 19c and withdrawn through discharge port 25. Discharge port 25 may be located at any desired height of melt pool 19c.

It should be apparent to one upon reading this description that the vertical shaft melting furnace shape ma be modified to provide different solids residence times at various vertical locations by variations of its cross-sectional area. Likewise, the vertical shaft melting furnace may be combined with other vertical shaft melting furnaces or other types of melting furnaces in any combination to achieve desired operating conditions. The vertical shaft melting furnace may also be combined with any melt treatment desired, as is readily apparent to one upon reading this description.

The apparatus and process of this invention provides utilization of inexpensive and less polluting natural fuels, instead of coke, in the vertical shaft melting of solids and in melt treating zones. In the process of this invention, a significant portion or all of the solid feed material is continuously charged to the top of the solids bed which serves as a preheating and size reduction melting zone. The hot combustion product gases from submerged and headspace or freeboard combustion pass upwardly through the solids bed preheating the solids and as the solids pass downwardly through the bed, the surface of the solids melts forming melt which flows downwardly through the solids bed and through the cooled support grid falling into the melt pool at the bottom of the melter. As the surface of the solid particles are melted as they descend in the solids bed, the average particle size becomes smaller, some solid particles being melted entirely and others being reduced to a size smaller than the support grid openings. The melt and the smaller solid particles falling through the cooled support grid enter the melt pool at the bottom of the melter where the solids are substantially completely melted by submerged combustion. It is seen that the process of this invention is preferably a continuous process wherein feed solids are continuously added to the top of the solids bed and melt is continuously withdrawn from the melt pool at the bottom of the melter. The product quality of the melt according to the present process, is higher than prior cupola-type melting processes since the present process does not utilize foreign solids, such as coke or particulate bed supports, which may fall into and contaminate the melt. The apparatus and process of this invention with submerged combustion provides higher combustion and melting intensities and higher specific and unit production rates, as well as higher thermal efficiencies.

The process of this invention does result in a melt product having gaseous inclusions which may not be immediately and directly suitable for some uses, such as lass melt for container or flat glass. However, the product liquid is very homogenized and subject to stringent temperature controls resulting in a melt which is very suitable for production of a number of products, such as mineral wool, fiberglass, iron, copper, and the like. The process is especially suited to a wide variety of chemical processes wherein contamination is not desired, homogeneity and uniform temperature of the melt is important, gaseous inclusions do not adversely affect product quality, and gaseous product is produced, such as conversion of phosphate rock to phosphorous which is now performed in an expensive electric furnace process.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for melting solids comprising:
  charging meltable solids to an upper region of a bed of said solids supported in a vertical shaft melting furnace by a support means consisting of a fluid cooled support grid having openings smaller than an average diameter of said meltable solids;
  maintaining a melt pool at a bottom of said vertical shaft melting furnace;
  maintaining submerged combustion in said melt pool thereby producing combustion product gases;
  passing said combustion product gases of said submerged combustion upwardly through said bed of solids preheating and melting a portion of said solids forming melt which flows downwardly into said melt pool and partially melting a remaining portion of said solids reducing their size to a sufficiently small size to pass through said support grid openings into said melt pool.

2. A process for melting solids according to claim 1 wherein about 5 to about 95 weight percent of said solids are melted in said bed.

3. A process for melting solids according to claim 1 wherein about 25 to about 75 weight percent of said solids are melted in said bed.

4. A process for melting solids according to claim 1 wherein said charging solids are added continuously to the upper region of said bed.

5. A process for melting solids according to claim 1 wherein said charging solids are added intermittently to the upper region of said bed.

6. A process for melting solids according to claim 1 wherein oxidizing gas is preheated by thermal exchange with said combustion product gases.

7. A process for melting solids according to claim 1 wherein fuel is preheated by thermal exchange with said combustion product gases.

8. A process for melting solids according to claim 1 wherein said melt and said reduced size solids pass through a freeboard zone between said cooled support grid and said melt pool.

9. A process for melting solids according to claim 8 wherein freeboard combustion is maintained in said freeboard zone.

10. A process for melting solids according to claim 1 wherein said submerged combustion is carried out under substoichiometric conditions.

11. A process for melting solids according to claim 1 wherein said cooled support grid openings are sized to include a refractory covering said support grid and a frozen layer of melt formed under operating conditions.

12. A process for melting solids according to claim 1 additionally charging an amount of said solids having smaller average diameters than said support grid openings directly to said melt pool.

13. A process for melting solids according to claim 1 additionally charging additional molten said meltable solids directly to said melt pool.

14. A process for melting solids according to claim 1 additionally passing said melt from said melt pool to a melt treatment pool maintained with a melt treatment headspace contiguous with and open to a freeboard zone between said cooled support grid and said melt pool.

15. A process for melting solids according to claim 1 additionally passing said melt from said melt pool to a melt treatment pool maintained with a melt treatment headspace separated from a freeboard zone between said cooled support grid and said melt pool in a manner that different chemical conditions may be maintained in each said melt pool and freeboard zone and said melt treatment pool and headspace.

16. A process for melting solids according to claim 15 by maintaining reducing conditions in said melt pool and freeboard zone and oxidizing conditions in said melt treatment pool and headspace.

17. A process for melting solids according to claim 15 by maintaining oxidizing conditions in said melt pool and freeboard zone and reducing conditions in said melt treatment pool and headspace.

18. A process for melting solids according to claim 15 by maintaining reducing conditions in said melt pool and freeboard zone and in said melt treatment pool and headspace.

19. A process for melting solids according to claim 15 by maintaining oxidizing conditions in said melt pool and freeboard zone and in said melt treatment pool and headspace.

20. A process for melting solids according to claim 15 additionally comprising introducing a reducing agent to said melt pool.

21. A process for melting solids according to claim 15 additionally comprising introducing a reducing agent to said melt treatment pool.

22. In a process for melting solids in a vertical shaft melting furnace wherein meltable solids are charged to an upper region of a bed of said solids maintained on support means over a melt pool at a bottom of said vertical shaft furnace, the improvement comprising; said support means consisting of a fluid cooled support grid having openings smaller than an average diameter of said charged solids, maintaining submerged combustion in said melt pool thereby producing combustion product gases and passing said combustion product gases upwardly through said bed of solids preheating and melting a portion of said solids forming melt which flows downwardly into said melt pool and partially melting a remaining portion of said solids reducing their size sufficiently to pass through said support grid openings into said melt pool.

23. In a process for melting solids according to claim 22, the improvement wherein about 5 to about 95 weight percent of said solids are melted in said bed.

24. In a process for melting solids according to claim 22, the improvement wherein about 25 to about 75 weight percent of said solids are melted in said bed.

25. In a process of claim 22 the improvement wherein said melt and said reduced size solids pass through a freeboard zone between said cooled support grid and said melt pool.

26. In a process of claim 25 the improvement wherein freeboard combustion is maintained in said freeboard zone.

27. In a process of claim 22 the improvement wherein said submerged combustion is carried out under substoichiometric conditions.

28. In a process of claim 22 the improvement wherein said cooled support grid openings are sized to include a refractory covering said support grid and a frozen layer of melt formed under operating conditions.

29. In a process of claim 22 the improvement additionally comprising charging an amount of said solids having smaller average diameters than said support grid openings directly to said melt pool.

30. In a process of claim 22 said improvement additionally comprising passing said melt from said melt pool to a melt treatment pool maintained with a melt treatment headspace contiguous with and open to a freeboard zone between said cooled support grid and said melt pool.

31. In a process of claim 22 said improvement additionally comprising passing said melt from said melt pool to a melt treatment pool maintained with a melt treatment headspace separated from a freeboard zone between said cooled support grid and said melt pool in a manner that different chemical conditions may be maintained in each said melt pool and freeboard zone and said melt treatment pool and headspace.

32. In a process of claim 31 said improvement additionally comprising maintaining reducing conditions in said melt pool and freeboard zone and oxidizing conditions in said melt treatment pool and headspace.

33. In a process of claim 31 said improvement additionally comprising maintaining oxidizing conditions in said melt pool and freeboard zone and reducing conditions in said melt treatment pool and headspace.

34. In a process of claim 31 by maintaining reducing conditions in said melt pool and freeboard zone and in said melt treatment pool and headspace 35. In a process of claim 31 by maintaining oxidizing conditions in said melt pool and freeboard zone and in said melt treatment pool and headspace.

36. A vertical shaft melting furnace for melting solids comprising: vertical containment walls and a bottom enclosing a bed of said solids and a melt pool below said bed; solid charge feeder means in the upper portion of said furnace; a solids bed support means to support said bed consisting of a fluid cooled support grid having openings smaller than the average diameter of said solids charged; submerged combustion means to maintain combustion within said melt pool; melt discharge means to withdraw melt from said melt pool; and circulation means for circulating said fluid through said fluid cooled support grid.

37. A vertical shaft melting furnace according to claim 36 having a flue from the upper portion of said furnace for discharge of combustion product gases, said flue having thermal exchange means therein for preheating fuel.

38. A vertical shaft melting furnace according to claim 36 having a flue from the upper portion of said furnace for discharge of combustion product gases, said flue having thermal exchange means therein for preheating oxidizing gas.

39. A vertical shaft melting furnace according to claim 36 having freeboard combustion means to maintain combustion in a freeboard zone between said cooled support grid and said melt pool.

40. A vertical shaft melting furnace according to claim 36 wherein said cooled support grid openings are sized to include a refractory covering said support grid and a frozen layer of melt formed under operating conditions.

41. A vertical shaft melting furnace according to claim 36 having charging port and charging means for introduction to said melt pool.

42. A vertical shaft melting furnace according to claim 36 additionally comprising a melt treatment pool containment vessel adjacent and in liquid communication with said melt pool of said furnace.

43. A vertical shaft melting furnace according to claim 42 additionally having a flue from the upper portion of a containment vessel for a headspace over said melt treatment pool.

44. A vertical shaft melting furnace according to claim 43 wherein said containment vessel for said headspace and said vertical containment walls form a contiguous open space for said headspace over said melt treatment pool and a freeboard zone between said cooled support grid and said melt pool.

45. A vertical shaft melting furnace according to claim 43 wherein said containment vessel for said headspace and said vertical containment walls form a melt treatment headspace separated from a freeboard zone between said cooled support grid and said melt pool.

46. A vertical shaft melting furnace according to claim 45 having headspace combustion means to maintain combustion in said headspace.

47. A vertical shaft melting furnace according to claim 42 having submerged combustion means to maintain combustion within said melt treatment pool.

48. A vertical shaft melting furnace according to claim 42 having charging port and charging means for introduction to said melt treatment pool.

49. A vertical shaft melting furnace according to claim 36 wherein said cooled support grid is within said melt pool.

* * * * *